(12) United States Patent
McBrearty

(10) Patent No.: US 9,392,058 B2
(45) Date of Patent: Jul. 12, 2016

(54) MIGRATION OF EXECUTING APPLICATIONS AND ASSOCIATED STORED DATA

(71) Applicant: International Business Machines Corporation, Armonk, NY (US)

(72) Inventor: Gerald F. McBrearty, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/729,162

(22) Filed: Jun. 3, 2015

(65) Prior Publication Data

US 2016/0173592 A1    Jun. 16, 2016

Related U.S. Application Data

(63) Continuation of application No. 14/570,208, filed on Dec. 15, 2014.

(51) Int. Cl.
*G06F 12/16* (2006.01)
*H04L 29/08* (2006.01)
*G06F 11/20* (2006.01)
*G06F 11/14* (2006.01)

(52) U.S. Cl.
CPC ........ *H04L 67/1095* (2013.01); *G06F 11/1456* (2013.01); *G06F 11/2074* (2013.01); *H04L 67/1097* (2013.01)

(58) Field of Classification Search
CPC ............ G06F 11/1456; H04L 67/1095; H04L 67/1097
USPC ........................................................ 711/162
See application file for complete search history.

(56) References Cited

U.S. PATENT DOCUMENTS

| 8,479,194 B2 | 7/2013 | Rangegowda et al. |
| 8,589,937 B2 | 11/2013 | Shultz et al. |
| 2005/0228937 A1 | 10/2005 | Karr et al. |
| 2005/0246453 A1 | 11/2005 | Erlingsson et al. |
| 2007/0169121 A1 | 7/2007 | Hunt et al. |

(Continued)

FOREIGN PATENT DOCUMENTS

EP    1701265 B1    3/2011

OTHER PUBLICATIONS

IBM et al, "Migrating Cross System Product Applications to VisualAge Generator", Version 31, SH23-0244-01, pp. 1-154, Second Edition (Nov. 1998), © Copyright International Business Machines Corporation 1980, 1998.

(Continued)

*Primary Examiner* — Jae Yu
(74) *Attorney, Agent, or Firm* — Steven F. McDaniel

(57) ABSTRACT

As disclosed herein, a method, executed by a computer, for migrating executing applications and associated stored data includes executing one or more applications in a source system environment that access data stored on a source storage device that is directly accessible within the source system environment, migrating the data to a target storage device that is directly accessible within a target system environment but is not directly accessible within the source system environment, wherein migrating the data comprises copying the data from the source storage device to the target storage device using a remote storage access protocol. A computer system and computer program product corresponding to the method are also disclosed herein.

18 Claims, 5 Drawing Sheets

(56) References Cited

U.S. PATENT DOCUMENTS

| | | | |
|---|---|---|---|
| 2012/0054264 A1* | 3/2012 | Haugh | G06F 9/5077 709/203 |
| 2013/0298122 A1 | 11/2013 | Rangegowda et al. | |
| 2013/0339979 A1 | 12/2013 | Hilton | |
| 2014/0033201 A1 | 1/2014 | Dawkins et al. | |

OTHER PUBLICATIONS

IBM et al., "z/VM Migration Guide", Version 5 Release 1, GC24-6103-01, Second Edition (Dec. 2004), pp. 1-239, This edition replaces GC24-6103-00, © Copyright International Business Machines Corporation 1992, 2004.

Mashtizadeh et al., "The Design and Evolution of Live Storage Migration in VMware ESX", VMware, Inc., referenced in IP&L Disclosure Evaluation dated Oct. 20, 2014, pp. 1-14, <https.//www.usenix.org/legacy/events/atc11/tech/final_files/Mashtizadeh.pdf>.

Tsien et al., "ORACLE Minimizing Data Migration Time, Using Cross-Platform Transportable Tablespace", Cross Platform Transportable Tablespace Case Study, pp. 1-5, Aug. 2006, Oracle Global IT: Case Study.

"A Complete Cross Platform Database Migration Guide Using Import and Export Utility", (HP-UX on PA-RISC to Linux on x86 Architecture), ViSolve Open Source Solutions, ViSolve Migration Team, pp. 1-14, Nov. 15, 2011, San Jose, California.

"FalconStor Data Migration: Easy-to-use, low-impact host-free data migration across storage devices", FalconStor® Defining Data Protection, Again.™, referenced in IP&L Disclosure Evaluation dated Oct. 20, 2014, <http.//www.falconstor.com/dmddocuments/Data_Migration_SB_HR.pdf>.

McBrearty, Gerald, F., "Migration of Executing Applications and Associated Stored Data", U.S. Appl. No. 14/570,208, filed Dec. 15, 2014, pp. 1-30.

IBM Appendix P, List of IBM Patents and Patent Applications Treated as Related, Jun. 3, 2015, p. 1-2.

McBrearty, Gerald, F., "Migration of Executing Applications and Associated Stored Data", U.S. Appl. No. 15/093,774, filed Apr. 8, 2016, pp. 1-28.

McBrearty, Gerald, F., "Migration of Executing Applications and Associated Stored Data", U.S. Appl. No. 15/093,850, filed Apr. 8, 2016, pp. 1-29.

IBM Appendix P, List of IBM Patents and Patent Applications Treated as Related, Apr. 8, 2016, p. 1-2.

* cited by examiner

MIGRATION OF EXECUTING APPLICATIONS AND ASSOCIATED STORED DATA

BACKGROUND OF THE INVENTION

The present invention relates generally to the field of virtualization in computing systems, and more particularly to migrating applications between virtualization systems.

In system virtualization, multiple virtual computing systems are created within a single physical computing system. The physical system can be a stand-alone computer, or alternatively, a computing system utilizing clustered computers and components. Virtual systems are independent operating environments that use virtual resources made up of logical divisions of physical resources such as processors, memory, and input/output (I/O) adapters. System virtualization is implemented through some managing functionality, typically hypervisor technology. Hypervisors, also called virtual machine managers (VMMs), use software or firmware to achieve fine-grained, dynamic resource sharing. Hypervisors are the primary technology for system virtualization because they provide the greatest level of flexibility in how virtual resources are defined and managed.

Hypervisors provide the ability to divide physical computing system resources into isolated logical partitions or virtual machine. Each logical partition operates like an independent computing system (i.e., virtual machine) running its own operating system (e.g., a virtual system). Operating systems running in a virtualized environment are often referred to as "guest machines." Exemplary operating systems include AIX®, IBM® i, Linux®, and the virtual I/O server (VIOS). Hypervisors can allocate dedicated processors, I/O adapters, and memory to each logical partition and can also allocate shared processors to each logical partition. Unbeknownst to the logical partitions, the hypervisor creates a shared processor pool from which the hypervisor allocates virtual processors to the logical partitions as needed. In other words, the hypervisor creates virtual processors from physical processors so that logical partitions can share the physical processors while running independent operating environments.

The hypervisor can also dynamically allocate and de-allocate dedicated or shared resources (such as processors, I/O, and memory) across logical partitions while the partitions are actively in use. This is known as dynamic logical partitioning (dynamic LPAR) and enables the hypervisor to dynamically redefine all available system resources to reach optimum capacity for each partition.

To increase the flexibility and dynamic capabilities of such systems, executing applications may be migrated from one virtualization environment to another. However, currently available virtualization environments require that the storage devices (e.g., arrays) and storage subsystems that store data for the executing applications be directly accessible (e.g., via a logical unit number) by the source and target computing environments involved in migration. Consequently, migration of executing application between computing environments that have storage devices or storage systems from different vendors is problematic.

SUMMARY

As disclosed herein, a method, executed by a computer, for migrating executing applications and associated stored data includes executing one or more applications in a source system environment that access data stored on a source storage device that is directly accessible within the source system environment, migrating the data to a target storage device that is directly accessible within a target system environment but is not directly accessible within the source system environment, wherein migrating the data comprises copying the data from the source storage device to the target storage device using a remote storage access protocol. A computer system and computer program product corresponding to the method are also disclosed herein.

DETAILED DESCRIPTION

The embodiments disclosed herein enable migration of executing applications and associated stored data.

Figure 1A:
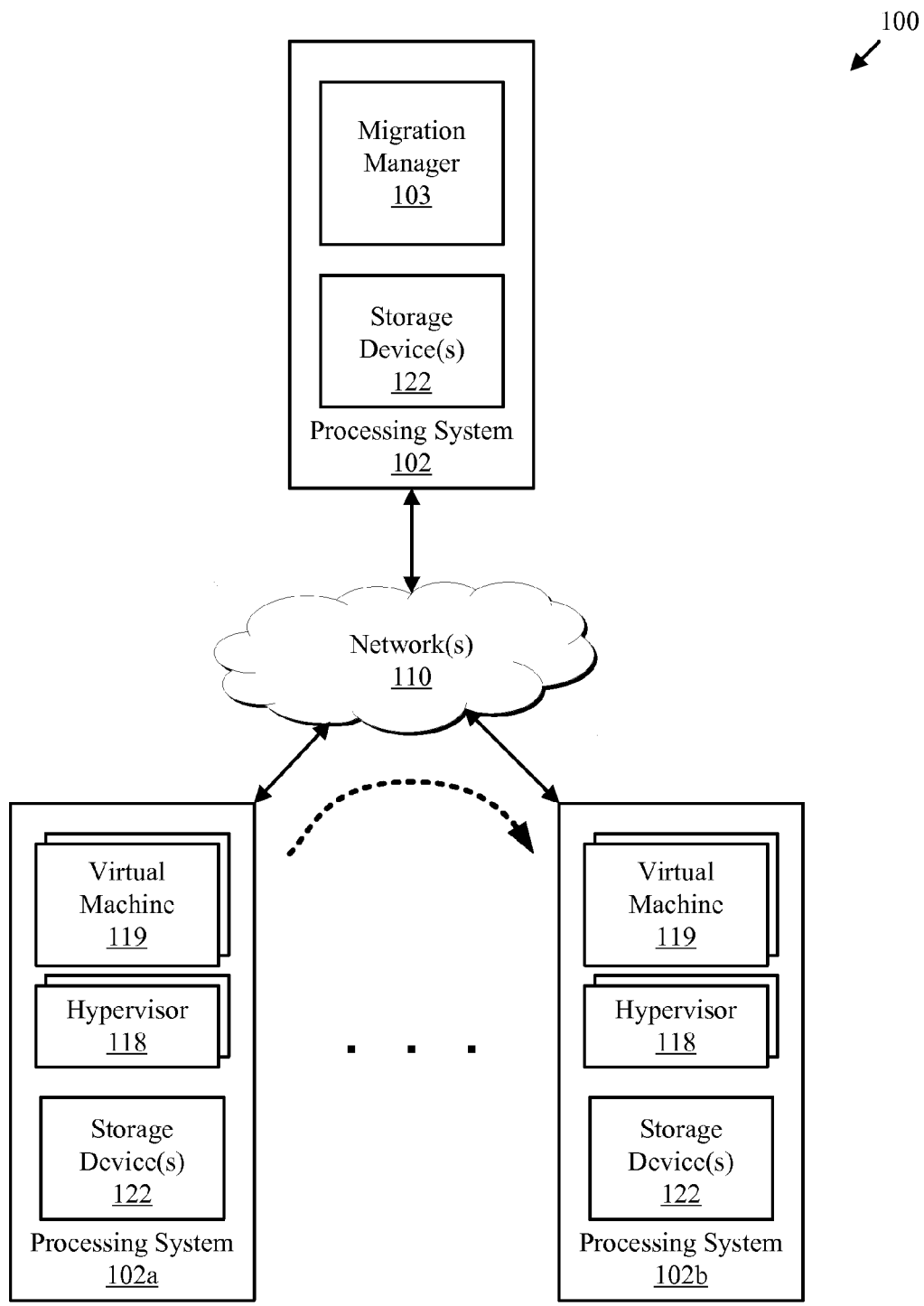
FIGS. 1A and 1B are block diagrams depicting one embodiment of one or more virtualized computing environment(s) in which at least some of the embodiments disclosed herein may be deployed.
Figure 1B:
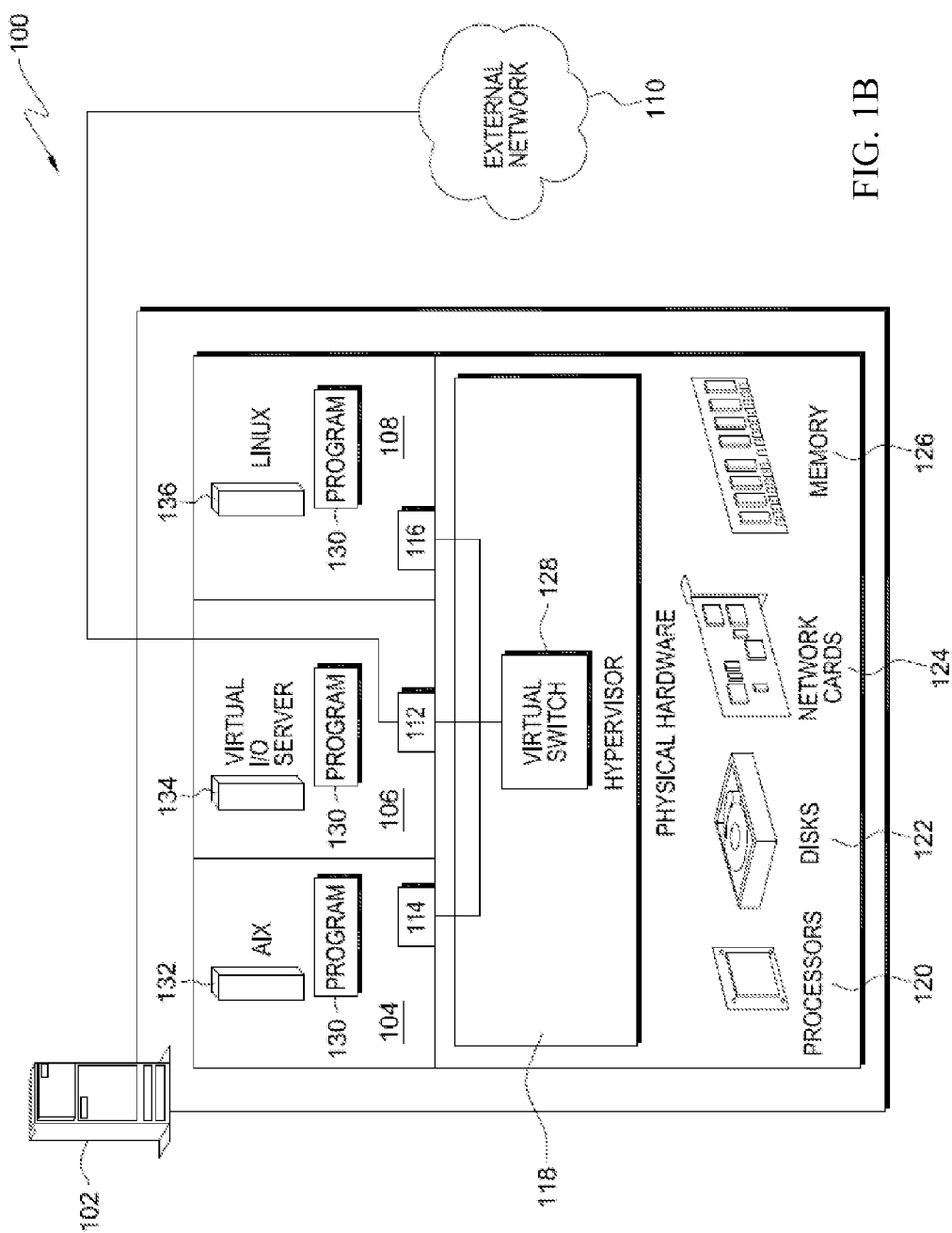

FIGS. 1A and 1B show an example of an operating environment 100 applicable to various embodiments of the present invention. In particular, FIGS. 1A and 1B show an example of an operating environment applicable to virtual machine (VM) migration. FIG. 1A shows an operating environment 100 comprising a plurality of processing nodes, such as processing systems 102. Each of the plurality processing nodes 102 are communicatively coupled to a network 110 such as, but not limited to, a data center network. The data center network 110 can comprise, but is not limited to, a three-tier architecture. In one embodiment, one or more processing nodes 102 comprise one or more hypervisors 118. Each of these processing nodes 102 can also comprise one or more virtual machines (VMs) 119. One or more of the information processing systems 102 may comprise a VM migration manager 103 that manages the migration of the VMs 119. For example, executing applications (not shown) on a source processing system 102a that access one or more local storage devices 122 may be migrated to a target processing system 102b.

FIG. 1B depicts specific aspects of one example of the operating environment 100 in which at least some of the embodiments disclosed herein may be deployed. In the depicted example, processing node 102 has been divided into multiple logical partitions 104, 106, and 108. In the illustrated example, each of the respective logical partitions 104, 106, and 108 is a virtual machine 119 (see FIG. 1A) that runs an independent operating environment, such as an OS that supports the execution of applications. For example, logical partition 104 runs an OS 132, which can be AIX®, logical partition 106 (hereafter VIOS partition 106) runs a VIOS 134, and logical partition 108 runs an OS 136, which can be Linux®. Other operating environments and combinations of operating environments may be used. In another embodiment, any number of partitions may be created and may exist on separate physical computers of a clustered computer system.

Communications from external network 110 may be routed through Shared Ethernet adapter (SEA) 112 on VIOS partition 106 to virtual adapters 114 and 116 on respective logical partitions 104 and 108. Communications from virtual adapters 114 and 116 on respective logical partitions 104 and 108 may be routed through Shared Ethernet adapter (SEA) 112 on VIOS partition 106 to external network 110. In an alternative embodiment, physical network adapters may be allocated to logical partitions 104, 106, and 108.

Hypervisor 118 forms logical partitions 104, 106 and 108 from the physical computing resources of computer 102 through logical sharing of designated physical computing resources (or portions thereof) such as processors 120, storage devices 122, I/O adapters 124 (e.g., network interface cards), and/or memory 126. Hypervisor 118 performs standard operating system functions and manages communications between logical partitions 104, 106, and 108 via virtual switch 128.

Logical partitions 104, 106, and 108 each include various programs or tasks 130 and various physical resources such as processors 120, storage devices 122, I/O adapters 124, and memory 126. The hypervisor 118 allocates all or a portion of the physical resources (e.g., a portion of the available bandwidth) to one or more programs 130 which may be executing in different logical partitions.

The embodiments disclosed herein may be leveraged by the processing systems 102 in order to facilitate the migration of applications executing on the virtual machines 119 without requiring direct access to the stored data by both the source processing system 102a and the target processing system 102b.

Figure 2:
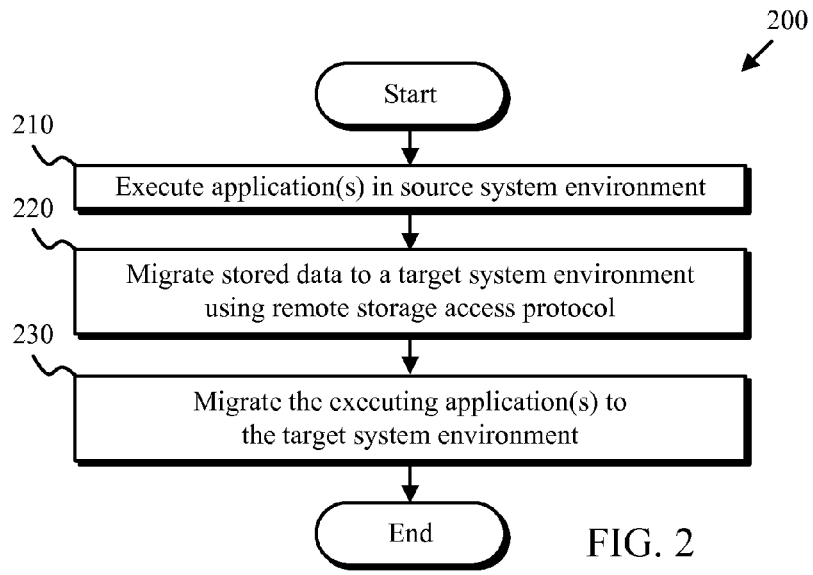
FIG. 2 is a flowchart depicting one embodiment of a virtual environment migration method in accordance with the present invention.

FIG. 2 is a flowchart depicting one embodiment of a virtual environment migration method 200 in accordance with the present invention. As depicted, the virtual environment migration method 200 includes executing (210) one or more applications in a source system environment, migrating (220) stored data to a target system environment, and migrating (230) the executing applications to the target system environment. The virtual environment migration method 200 enables the migration of executing applications between system environments where stored data is not directly accessible to both the source and target system environments. The virtual environment migration method 200 may be executed by the migration manager 103 and/or other modules or devices associated with the operating environment 100.

Executing (210) may include executing one or more applications in a source system environment. For example, one or more applications may be executed on a virtual machine 119 on a source processing system 102a. The virtual machine may be managed by the hypervisor 118.

Migrating (220) stored data to a target system environment may include transferring data from a source storage device associated with a source system environment to a target storage device associated with a target system environment. The source system environment and the target system environment may comprise a processing system 102 and associated infrastructure such as the network(s) 110. To facilitate transfer from a source storage device to a target storage device that are not directly accessible from both the source system environment and the target system environment, a remote storage access protocol is used to transfer the data.

Migrating (230) the executing applications to the target system environment may include operations understood by those of skill in the art. For example, the executing applications on the source system environment may be suspended (without terminating the executing applications) and state information such the contents of memory may be transferred to the target system environment. To facilitate continuation of the executing applications in the target system environment, the stored data for the executing applications residing on the source storage devices must continue to be available to the executing applications.

The embodiments disclosed herein enable continued access to the stored data before, during, and after the stored data is migrated from the source storage device(s) to the target storage device(s). In some embodiments the order of execution of the migrating operations is reversed from what is shown in FIG. 2, so that migration of the executing applications occurs before migration of the stored data. In certain embodiments, migration of the executing applications may occur concurrently with migration of the stored data.

Migrating (220) stored data to a target system environment may be achieved in several ways. In some embodiments, data is repeatedly retrieved from the source storage device with a local storage access protocol that is invoked within the source system environment. The retrieved data is then 'pushed' to the target storage device using a remote storage access protocol. The recursive retrieval and pushing of data is continued until all stored data associated with the executing applications is transferred from the source storage device to the target storage device.

In other embodiments, data is repeatedly 'pulled' from the source storage device with a remote storage access protocol that is invoked within the target system environment. The pulled data is then written to the target storage device using a local storage access protocol. The recursive pulling and writing of data is continued until all stored data associated with the executing applications is transferred from the source storage device to the target storage device.

In one embodiment, data is 'pushed' from the source storage device to the target storage device by a storage migration process executing in the source system environment before and during migration of the executing applications. Once each application is migrated, data may be pulled from the source storage device to the target storage device by a storage migration process executing in the target system environment until all the stored data for the executing application is transferred. Subsequently, the stored data may be accessed on the target storage device by the executing applications (which are now executing within the target system environment).

Figure 3:
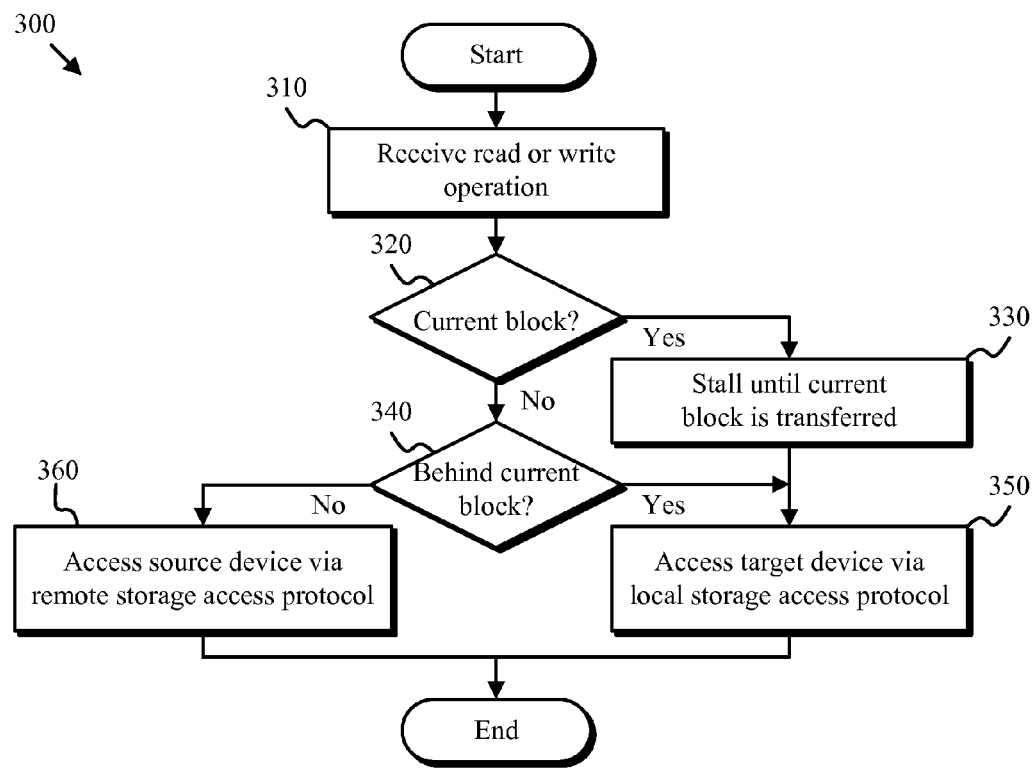
FIG. 3 is a flowchart depicting one embodiment of a stored data migration method in accordance with the present invention.

FIG. 3 is a flowchart depicting one embodiment of a stored data migration method 300 in accordance with the present invention. As depicted, the stored data migration method 300 includes receiving (310) a read or write operation, determining (320) if the operation references a current block, stalling (330) until the current block is transferred, determining (340) whether the operation is behind the current block, accessing (350) a target device, and accessing (360) a source device. The storage migration method 300 is one example of a 'pull' version of the stored data migration operation 220 that can be conducted after migration of the executing applications (e.g., operation 230).

The stored data migration method 300 may be conducted by an I/O manager associated with a target system environment. For example, the stored data migration method 300 may be conducted by an I/O manager within a hypervisor 118, a virtual machine 119, a storage device 122, or a driver for one or more storage devices 122 (not shown in the drawings) or similar component of a target processing system 102b that is the target of executing applications that need to be migrated.

Receiving (310) a read or write operation may include receiving an instruction to read or write a block of data from/to a storage device (or portion thereof) assigned to a particular virtual machine 119. The instruction may reference the storage device and a storage location on the storage device for the block of data. For example, the instruction may specify a block index within a particular volume. In some embodiments, the particular volume is specified with a logical unit number (LUN).

Determining (320) if the operation references a current block may include comparing the block index or a similar indicator with a current block indicator. The current block indicator may specify which block of data is currently being transferred from a source storage device associated with the source system environment to a target storage device associated with the target system environment. The transfer of the current block may be controlled by a data transfer process (e.g., conducted by an I/O manager or driver) preferably executing on the target processing system 102b in order to facilitate reliable coordination with the method 300 regarding the current block that is being transferred.

In one embodiment, the data transfer process associated with the method 300 resides on the target processing system 102b and repeatedly retrieves a current block from the source storage device via a remote storage access protocol, writes the current block to the target storage device with a local storage access protocol, and advances the current block to a next block. Alternately, the data transfer process associated with the method 300 may reside elsewhere within the operating environment 100 such as on the source processing system 102a or the migration manager 103. The data transfer process may be executed as a foreground or background process.

Stalling (320) until the current block is transferred may include polling the current block indicator until it changes or suspending processing (e.g., sleeping) until an event occurs such as a timing interrupt or data transfer interrupt.

Determining (340) whether the operation is behind the current block may include comparing the block index or a similar indicator specified in the read or write instruction with the current block indicator. If the operation is behind the current block (indicating that the referenced block has already been transferred to the target device), the depicted method proceeds by accessing (350) the target device. Otherwise, the method 300 advances by accessing (360) the source device.

Accessing (350) the target device may including accessing the target device with a local storage access protocol. Examples of a local storage access protocol include SCSI, SAS, and Fibre Channel.

Accessing (360) the source device may include accessing the target device with a remote storage access protocol. Examples of a remote storage access protocol include RDMA, iSER, and iSCSI. Using a remote storage access protocol enables read or writing data blocks that have been transferred to the target storage device even when the target storage device is not directly accessible.

Figure 4:
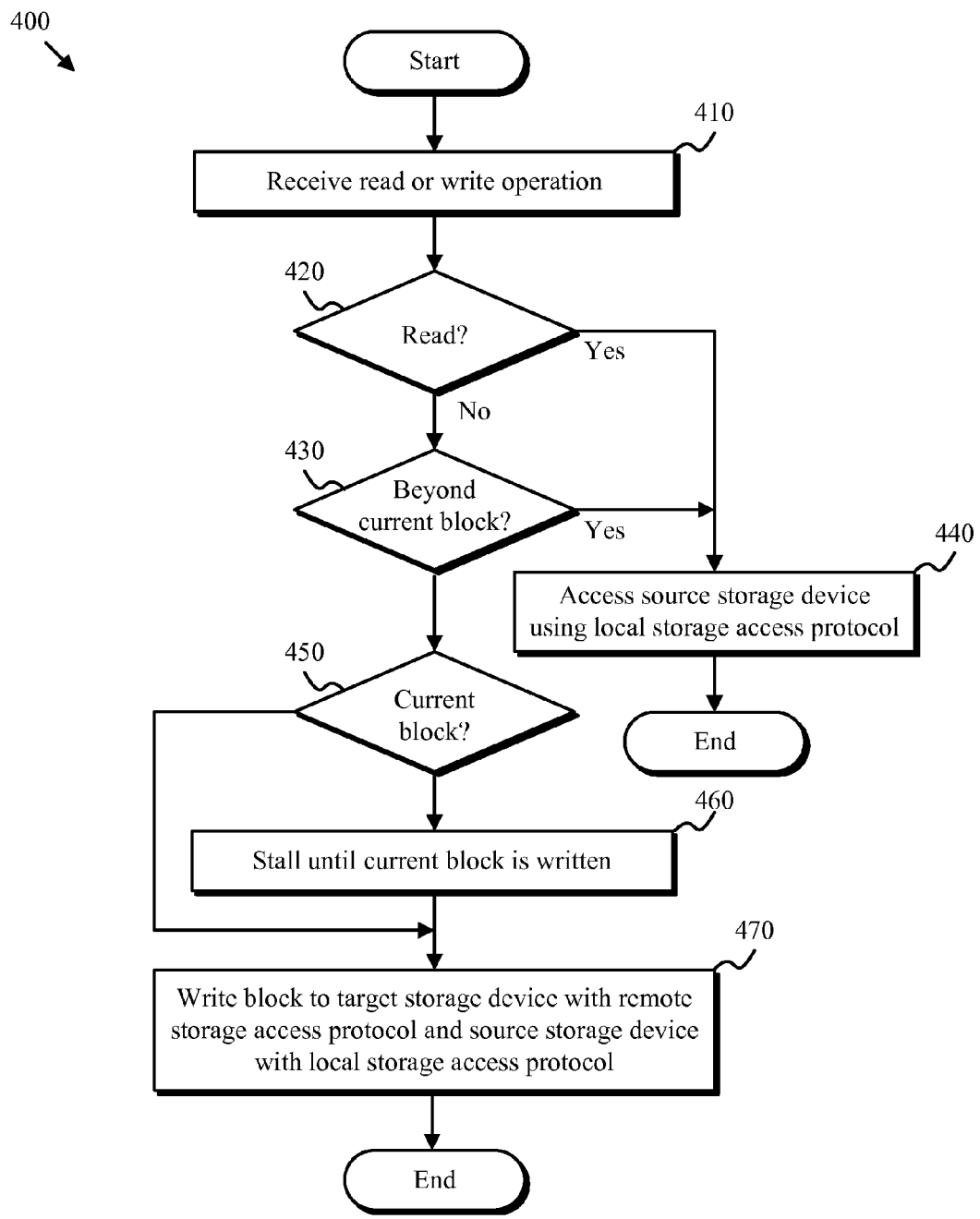
FIG. 4 is a flowchart depicting one embodiment of another stored data migration method in accordance with the present invention.

FIG. 4 is a flowchart depicting one embodiment of another stored data migration method 400 in accordance with the present invention. As depicted, the stored data migration method 400 includes receiving (410) a read or write operation, determining (420) if the operation is a read operation, determining (430) if the operation is for data beyond the current block, accessing (440) a source storage device, determining (450) if the operation references the current block, stalling (460) until the current block is written, and writing (470) a block of data. The storage migration method 400 is one example of a 'push' version of the stored data migration operation 220 that can be conducted before and during migration of the executing applications (e.g., operation 230).

The stored data migration method 400 may be conducted by an I/O manager associated with a source system environment. For example, the stored data migration method 400 may be conducted by an I/O manager within a hypervisor 118, a virtual machine 119, a storage device 122, or a driver for one or more storage devices 122 (not shown in the drawings) or similar component of a source processing system 102a that is the source of executing applications that need to be migrated.

In conjunction with the stored data migration method 400, a data transfer process may be executed by the source processing system 102a. In one embodiment, the data transfer process comprises repeatedly retrieving a current block from the source storage device via a local storage access protocol, writing the current block to the target storage device with a remote storage access protocol, and advancing the current block to a next block.

The data transfer process associated with the method 400 (or the method 300) may be executed from either end of a storage media (e.g., a disk) associated with a storage device 122. In some embodiments, data migration from each end is conducted in parallel. Executing a data transfer process from both ends in parallel enables quicker completion of the method 400. When conducted in parallel from each end, the data transfer process may be conducted by an I/O manager executing on the source processing system 102a, the target processing system 102b, or both the source processing system 102a and the target processing system 102b.

Similar to receiving (310), receiving (410) a read or write operation may include receiving an instruction to read or write a block of data from/to a storage device (or portion thereof) assigned to a particular virtual machine 119. The instruction may reference the (source) storage device and a storage location on the storage device for the block of data.

Determining (420) if the operation is a read operation may include testing a flag or parameter to determine if the instruction is a read instruction or a write instruction.

Determining (430) if the operation is for data beyond the current block may include comparing the block index or a similar indicator specified in the read or write instruction with the current block indicator. If the operation is beyond the current block (indicating that the referenced block has not yet been transferred to the target device), the depicted method proceeds by accessing (440) a source storage device. Otherwise, the method 400 advances by accessing determining (450) if the operation references the current block.

Determining (450) if the operation references the current block may be conducted similar to the determining operation 320. Similarly, stalling (460) until the current block is written may be conducted similar to the stalling operation 330.

Writing (470) a block of data may include writing the block of data referenced by the instruction received in the receiving operation 410. The block of data may be written to both the target storage device with a remote storage access protocol and to the source storage device with a local storage access protocol. Writing the block of data to both devices enables the method 400 to service read operations without requiring remote access to the target storage device.

Figure 5:
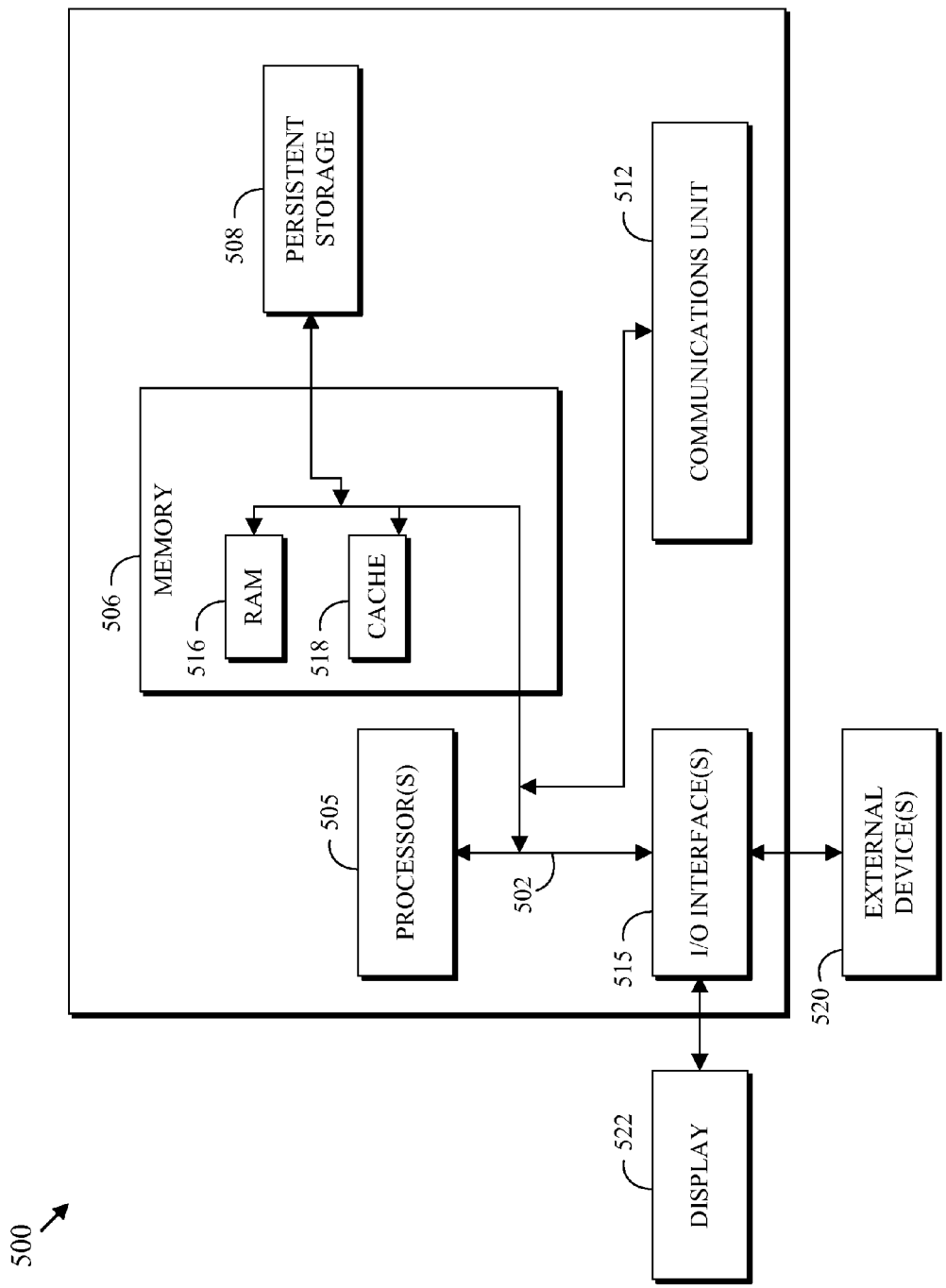
FIG. 5 is a block diagram depicting one example of a computing apparatus (i.e., computer) suitable for executing the methods disclosed herein.

The foregoing methods enable migration of executing applications and associated stored data. FIG. 5 is a block diagram depicting components of a computer 500 suitable for executing the methods disclosed herein. The computer 500 may be one embodiment of the processing system 102 depicted in FIGS. 1A and 1B. It should be appreciated that FIG. 5 provides only an illustration of one embodiment and does not imply any limitations with regard to the environments in which different embodiments may be implemented. Many modifications to the depicted environment may be made.

As depicted, the computer 500 includes communications fabric 502, which provides communications between computer processor(s) 505, memory 506, persistent storage 508, communications unit 512, and input/output (I/O) interface(s) 515. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In the depicted embodiment, memory 506 includes random access memory (RAM) 516 and cache memory 518. In general, memory 506 can include any suitable volatile or non-volatile computer readable storage media.

One or more programs may be stored in persistent storage 508 for execution by one or more of the respective computer processors 505 via one or more memories of memory 506. The persistent storage 508 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 512, in these examples, provides for communications with other data processing systems or devices. In these examples, communications unit 512 includes one or more network interface cards. Communications unit 512 may provide communications through the use of either or both physical and wireless communications links.

I/O interface(s) 515 allows for input and output of data with other devices that may be connected to computer 500. For example, I/O interface 515 may provide a connection to external devices 520 such as a keyboard, keypad, a touch screen, and/or some other suitable input device. External devices 520 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 508 via I/O interface(s) 515. I/O interface(s) 515 may also connect to a display 522. Display 522 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The embodiments disclosed herein include a system, a method, and/or a computer program product. The computer program product may include a computer readable storage medium (or media) having computer readable program instructions thereon for causing a processor to carry out the methods disclosed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product for migrating executing applications and associated stored data, the computer program product comprising:
one or more computer readable storage media and program instructions stored on the one or more computer readable storage media, the program instructions comprising instructions to:
execute applications in a source system environment that access data stored on a source storage device that is directly accessible within the source system environment;
migrate the data to a target storage device that is directly accessible within a target system environment but is not directly accessible within the source system environment, wherein migrating the data comprises copying the data from the source storage device to the target storage device using a remote storage access protocol;
migrate the executing applications from the source system environment to the target system environment; and
wherein the instructions to migrate the data comprise instructions to retrieve a current block from the source storage device via a remote storage access protocol, write the current block to the target storage device with a local storage access protocol, and advance the current block to a next block.

2. The computer program product of claim 1, wherein the remote storage access protocol is at least one of RDMA, iSCSI, and iSER.

3. The computer program product of claim 1, wherein the instructions to migrate the executing applications are conducted without terminating the executing applications.

4. The computer program product of claim 1, wherein the instructions to migrate the executing applications are conducted concurrently with the instructions to migrate the data.

5. The computer program product of claim 1, wherein the instructions to migrate the executing applications are conducted before or after the instructions to migrate the data.

6. The computer program product of claim 1, wherein the instructions to migrate the data are conducted by a process executing in the target system environment.

7. The computer program product of claim 1, wherein the instructions to migrate the data comprise instructions to fulfill all read and write operations that are behind the current block with the target storage device.

8. The computer program product of claim 1, wherein the instructions to migrate the data comprise instructions to fulfill all read and write operations that are beyond the current block with the source storage device.

9. The computer program product of claim 1, wherein the instructions to migrate the data comprise instructions to execute a data transfer process comprising retrieving a current block from the source storage device via a local storage access protocol, writing the current block to the target storage device with a remote storage access protocol, and advancing the current block to a next block.

10. A computer system for migrating executing applications and associated stored data, the computer system comprising:
one or more computer readable storage media and program instructions stored on the one or more computer readable storage media, the program instructions comprising instructions to:
execute applications in a source system environment that access data stored on a source storage device that is directly accessible within the source system environment;
migrate the data to a target storage device that is directly accessible within a target system environment but is not directly accessible within the source system environment, wherein migrating the data comprises copying the data from the source storage device to the target storage device using a remote storage access protocol;
migrate the executing applications from the source system environment to the target system environment; and
wherein the instructions to migrate the data comprise instructions to retrieve a current block from the source storage device via a remote storage access protocol, write the current block to the target storage device with a local storage access protocol, and advance the current block to a next block.

11. The computer system of claim 10, wherein the remote storage access protocol is at least one of RDMA, iSCSI, and iSER.

12. The computer system of claim 10, wherein the instructions to migrate the executing applications are conducted without terminating the executing applications.

13. The computer system of claim 10, wherein the instructions to migrate the executing applications are conducted concurrently with the instructions to migrate the data.

14. The computer system of claim 10, wherein the instructions to migrate the executing applications are conducted before or after the instructions to migrate the data.

15. The computer system of claim 10, wherein the instructions to migrate the data are conducted by a process executing in the target system environment.

16. The computer system of claim 10, wherein the instructions to migrate the data comprise instructions to fulfill all read and write operations that are behind the current block with the target storage device.

17. The computer system of claim 10, wherein the instructions to migrate the data comprise instructions to fulfill all read and write operations that are beyond the current block with the source storage device.

18. The computer system of claim 10, wherein the instructions to migrate the data comprise instructions to execute a data transfer process comprising retrieving a current block from the source storage device via a local storage access protocol, writing the current block to the target storage device with a remote storage access protocol, and advancing the current block to a next block.

* * * * *